United States Patent [19]
Lee et al.

[11] Patent Number: 6,160,913
[45] Date of Patent: Dec. 12, 2000

[54] METHOD AND APPARATUS FOR DIGITAL HALFTONE DOTS DETECTION AND REMOVAL IN BUSINESS DOCUMENTS

[75] Inventors: Yongchun Lee; Stanley A. Mielcarek, both of Rochester; Joseph M. Basile, Ontario; Louis J. Beato, Rochester, all of N.Y.

[73] Assignee: Eastman Kodak Company, Rochester, N.Y.

[21] Appl. No.: 09/047,660

[22] Filed: Mar. 25, 1998

[51] Int. Cl.[7] .............................. G06K 9/56; G06K 9/62
[52] U.S. Cl. ........................ 382/176; 382/205; 382/224; 358/462
[58] Field of Search ..................................... 382/176, 224, 382/275, 270, 271, 272, 273, 205, 199; 358/462, 456, 463, 464, 465, 466, 467

[56] References Cited

U.S. PATENT DOCUMENTS

| | | | |
|---|---|---|---|
| 4,194,221 | 3/1980 | Stoffel | 358/456 |
| 4,403,257 | 9/1983 | Hsieh | 358/462 |
| 4,707,745 | 11/1987 | Sakano | 358/456 |
| 4,722,008 | 1/1988 | Ibaraki et al. | 358/456 |
| 5,131,049 | 7/1992 | Bloomberg et al. | 358/456 |
| 5,291,309 | 3/1994 | Semasa | 358/456 |
| 5,381,241 | 1/1995 | Kawanaka et al. | 358/462 |
| 5,392,365 | 2/1995 | Steinkirchner | 358/462 |
| 5,583,659 | 12/1996 | Lee et al. | 358/464 |
| 5,617,216 | 4/1997 | Wada | 358/456 |
| 5,987,221 | 11/1999 | Bearss et al. | 382/176 |

*Primary Examiner*—Jon Chang
*Attorney, Agent, or Firm*—Milton S. Sales

[57] ABSTRACT

An image processing method for detection and removal of halftone dots includes converting a gray scale image into a binary thresholded image with halftone dots; identifying halftone regions within the binary thresholded image; and removing halftone dots from the identified halftone regions. The identifying halftone regions step is effected by classifying the binary thresholded image to produce a halftone classification map; reclassifying the halftone classification map to produce a halftone reclassification map of lines with plural halftone pixels in each line; merging the halftone pixels in each line in the halftone reclassification map to produce a halftone line map; and merging the lines of the halftone line map to produce a halftone region map.

10 Claims, 18 Drawing Sheets

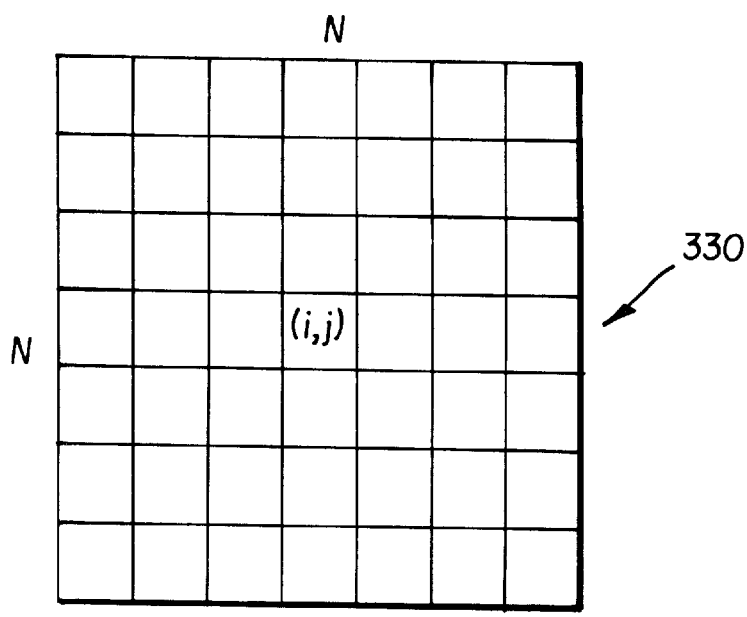
FIG. 3A
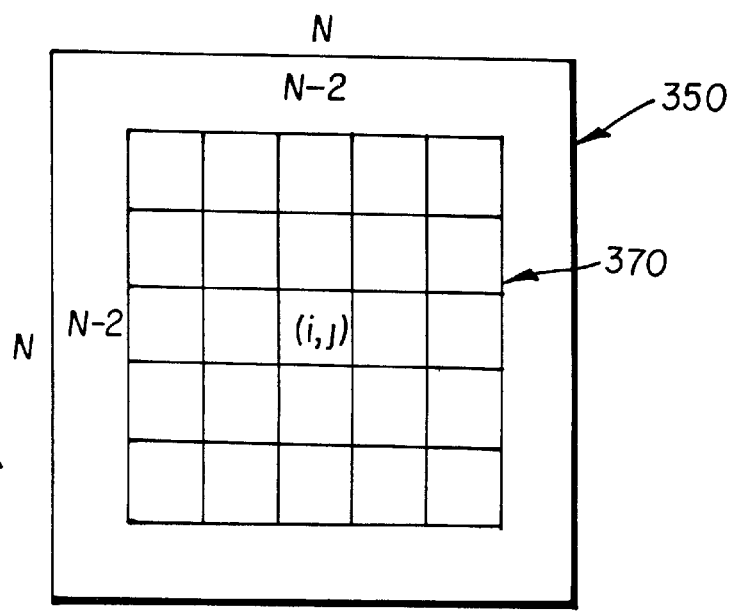
FIG. 3B
FIG. 3C

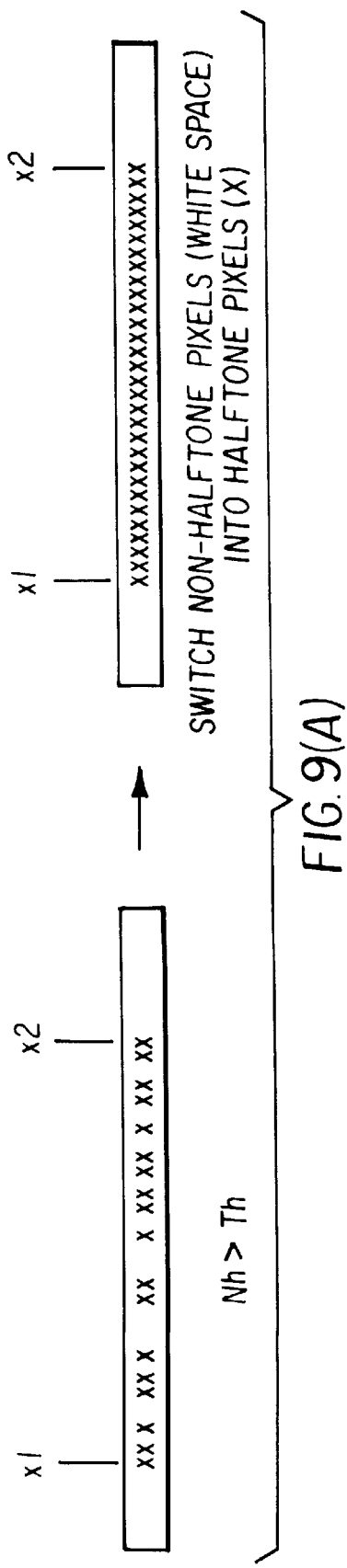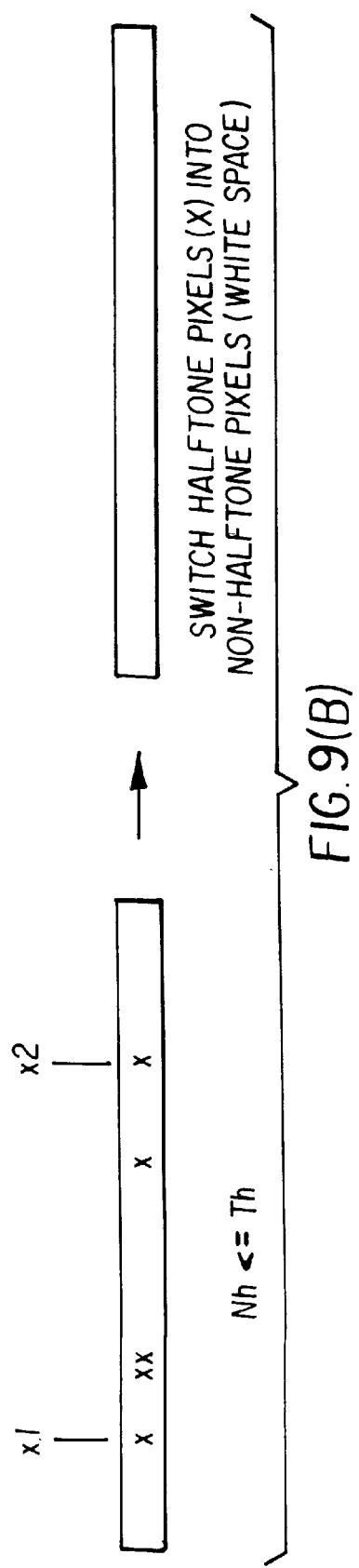

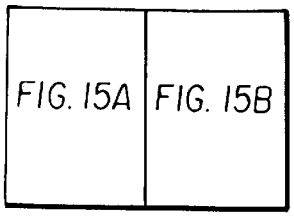
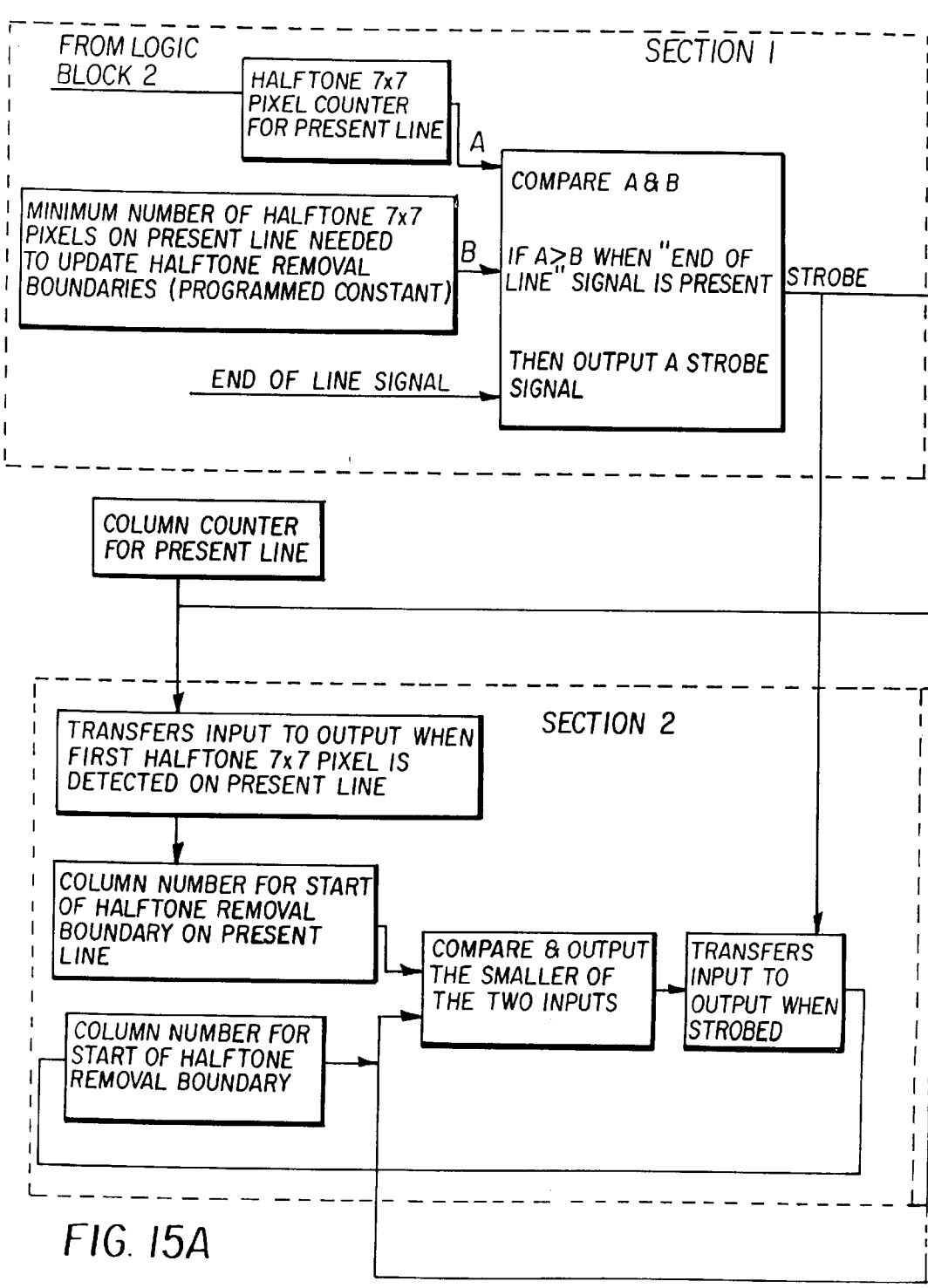
FIG. 15A

METHOD AND APPARATUS FOR DIGITAL HALFTONE DOTS DETECTION AND REMOVAL IN BUSINESS DOCUMENTS

FIELD OF THE INVENTION

The present invention relates generally to image processing, and more particularly to the detection and removal of digital halftone dots (i.e., printed pixels) in documents.

BACKGROUND OF THE INVENTION

With digital image processing and digital communication becoming increasingly prevalent today, increasing amounts of printed or other textual documents are being scanned for subsequent computerized processing and/or digital transmission. This processing may involve optical character recognition for converting printed characters, whether machine printed or handwritten, from scanned bit-mapped form into an appropriate character set, such as ASCII.

Gray-scale images are converted to binary images through a thresholding process. In essence, each multi-bit pixel value in a scanned gray-scale image is compared to a pre-defined threshold value, which may be fixed, variable, or adaptively variable, to yield a single corresponding output bit. If the multi-bit pixel value equals or exceeds the threshold value for that particular pixel, the resultant single-bit output pixel is set to a "ONE"; otherwise if the threshold is greater than the multi-bit pixel, then the resultant single-bit output pixel remains at "ZERO". In this manner, thresholding extracts those pixels which form desired objects from the background, with the pixels that form objects being one value, typically that for black, and the pixels for the background being another value, typically that for white. For ease of reference, we refer to each character, text, line art, or other desired object in the image as simply an "object".

There is an increasing number of business documents and forms which contain uniform color and/or gray-shaded background for enhancing presentation of the information in a document. The uniform color or gray shade in a document is often made by screened halftone dots. The percentage of halftone dots and the frequency of the halftone screen in the field determine the degree of shade. A light-shaded area contains less halftone dots, and a heavy-shaded area contains a higher percentage of halftone dots. Often, document objects are printed inside the halftoned areas.

When a document is scanned and binarized using existing thresholding techniques, the halftone dot structures in gray-shaded regions are present in the binarized image because existing document thresholding techniques are contrast-based in nature. The high occurrence of binary halftone dots in a binarized image adversely impacts image compression efficiency using standard image compression techniques. In order to reduce compressed image file size of a document image containing uniform halftone field, the removal of halftone dots is necessary before effecting image compression.

Halftone dot removal converts printed (say, black) pixels corresponding to halftone dots into un-printed (say, white) pixels (white background). Conventional halftone dot removal techniques include a process for electronically blurring the image such that halftoned regions exhibit a lesser optical density than solid regions. Next, the image is passed through a density thresholding process to remove pixels that occur in regions that have optical densities less than the threshold value. Such halftone dot removal techniques are generally effective, but tend to blur the information image.

There were several published methods for classifying halftone dots in a scanned document image for use in intelligent image rendering for scan-print systems. These methods include classifying halftone dots by examining the repetitive and periodic occurrence of halftone dots using autocorrelation (see U.S. Pat. No. 4,194,221 which issued to Stoffel on Mar. 18, 1980), feature matching with trained halftone data (see U.S. Pat. No. 4,403,257 which issued to Hsieh on Sep. 6, 1983), or frequencies of edge transition (see U.S. Pat. No. 4,722,008 which issued to Ibaraki et al. on Jan. 26, 1988). The classified halftone dots are then processed by a region growing method, such as known connected component or runlength smearing methods, to form halftone lines and regions.

DISCLOSURE OF THE INVENTION

The present invention is applicable for use in nearly any document imaging system for accurately detecting and removing halftone dots in documents containing objects, regardless of what the objects contain and the media upon which the objects originally appears. For example, the objects could be graphs, maps, characters and/or line (skeletal) drawings.

This invention is related to a method which is comprised of applying a thresholding process to convert a gray scale image into a binary image with halftone dots, classifying and labeling the halftone dots of the binary image as either objects or background, correcting any classification error line-by-line, grouping the halftone background lines into two dimensional halftone maps, and then erasing the halftone dots in the identified background locations.

To avoid artifacts, such as deletion of dot matrix printed objects, resulting from halftone dot removal, a two step processes is effected: first, halftone regions are identified and then halftone dots in the identified halftone regions are deleted. The identification of halftone regions involves a pixel classification to label every pixel of an image as a halftone-class pixel or a nonhalftone-class pixel based on analysis of dot structure in a local moving window, followed by a line correction process to repair classification errors.

A preferred embodiment of the present invention consists of: capturing a document image such as by a CCD array in raster scan fashion, extracting every edge pixel whose gradient is greater than a predetermined gradient threshold using an edge-based adaptive thresholding process (such as disclosed in U.S. Pat. No. 5,583,659 which issued to Lee et al. on Dec. 10, 1996), classifying every extracted edge pixel as either a halftone-class pixel or a non-halftone-class pixel by analyzing the spatial distribution of edge pixels in a 5×5 local moving window, re-assigning the classified edge pixels in a 7×7 local moving window based on the total number of halftone-class pixels which are classified in the previous step, correcting and merging the classified halftone-class pixels into halftone line segments, growing the halftone line segments into two dimensional halftone maps, deleting halftone-class pixels which were extracted in the classification of halftone edge pixels in the identified halftone maps, and applying a median filter to minimize noise and smooth character outlines in the identified halftone locations.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2 shows the correct alignment of the drawing sheets for FIGS. 2A and 2B;

FIG. 3A depicts a 3 by 3 matrix of pixel location definitions which we use in determining, through a "Sobel" gradient operator, gradient strength for current pixel (i,j);

FIG. 3B depicts a graphical representation of an N-by-N neighborhood of pixels centered about a current pixel (ij) in an image intensity record;

FIG. 3C depicts a graphical representation of an (N−2)-by-(N−2) neighborhood of pixels centered about pixel position (ij) in an image intensity gradient record;

FIGS. 9(A) and 9(B) are examples of halftone line correction based on the number of the classified halftone pixels in a scan line;

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

For purposes of illustration and discussion, we define black and white gray-scale pixels as having eight-bit gray-scale value of "0" and "255", respectively. For consistency, we also define output binary pixels with black being "ZERO" and white being "ONE". Clearly, our inventive method will function just as well with opposite definitions, though with all the relevant inequalities that compare pixel intensities, as would be readily apparent to those skilled in the art, reversed from those shown and described.

Figure 1:
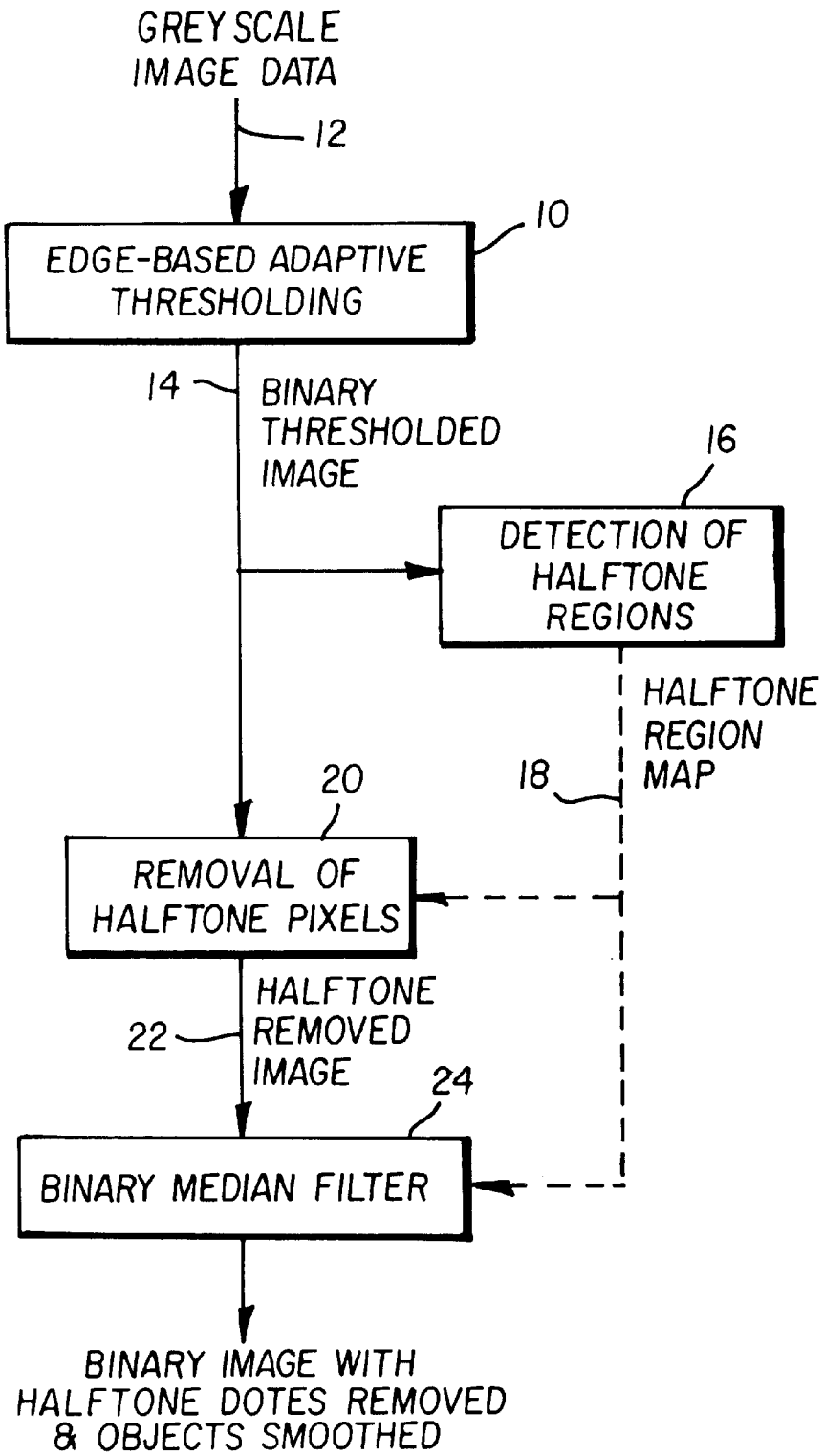
FIG. 1 is a flowchart of the major steps of a halftone detection and removal processing according to the present invention.

A very high level flowchart of an image processing method that performs the halftone detection and removal according to the present invention is shown in FIG. 1. An edge-based adaptive thresholding process 10 is applied to convert a gray scale image input 12 into a binary thresholded image output 14.

As will be explained in detail hereinafter, the thresholding process according to a preferred embodiment of the present invention determines if both (1) there exists at least a predetermined number of dots in a window and (2) a predetermined count of the number of adjacent (vertical or horizontal) dots in the window is not exceeded. If both of these criteria are met, the dots in the window are classified as halftone-class pixels.

Binary thresholded image output 14 is passed through a detection of halftone regions process 16, resulting in a halftone region map output 18 which labels each pixel as "ONE" (halftone) or "ZERO" (non-halftone) based on the total number of halftone-class pixels which are classified in thresholding process 10. A halftone dot removal operation 20 is then applied to the thresholded image only in the pixels which are labeled "ONE" as halftone, converting halftone region map output 18 to a halftone removed image output 22. The halftone removed image output is smoothed using a binary median filter 24 in the pixels which are labeled as halftone. The binary image resulting from halftone dot removal and edge smoothing will be more suitable for image compression.

Figure 2A:
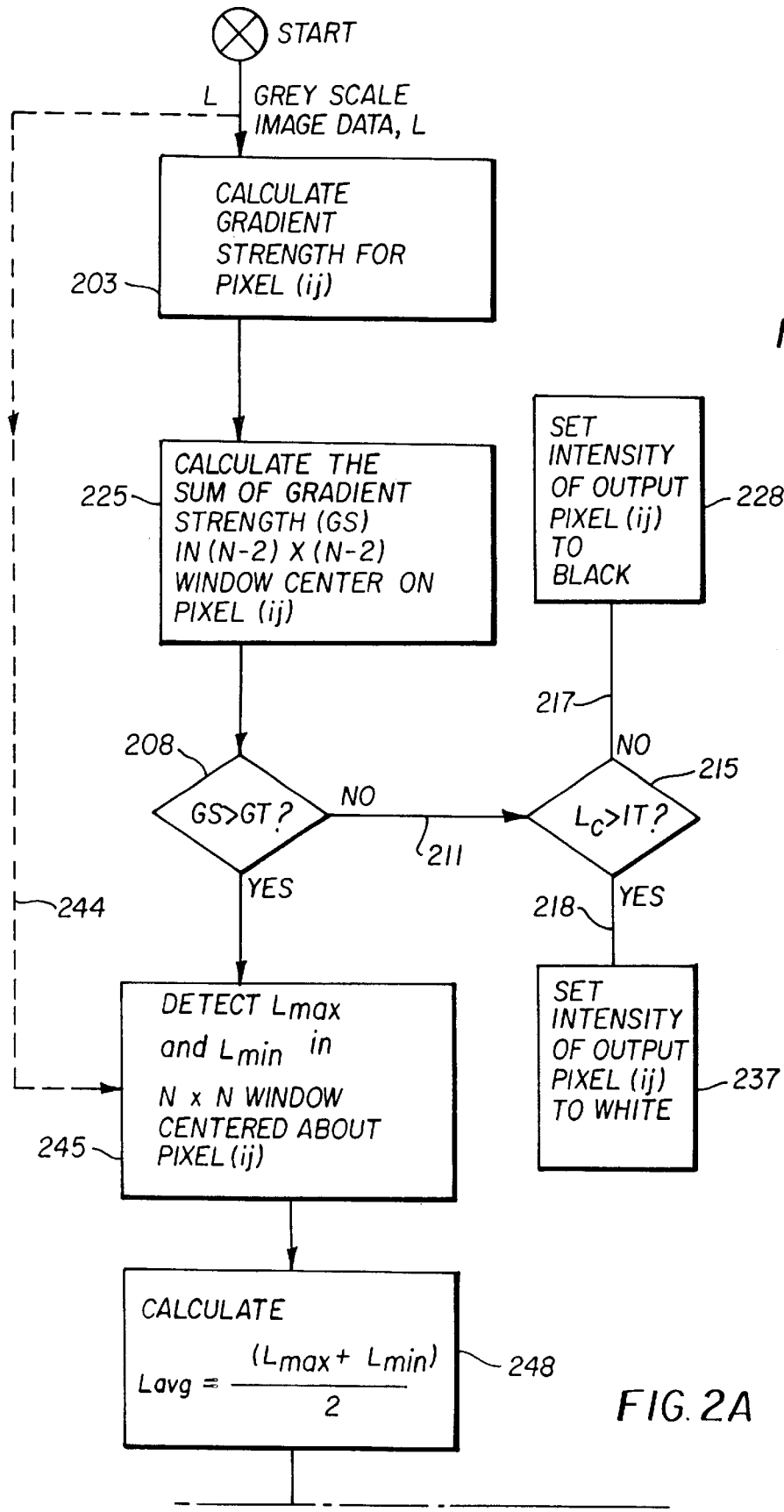
FIGS. 2A and 2B collectively depict a flowchart outlining the steps of an edge-based adaptive thresholding process shown in FIG. 1.
Figure 2B:
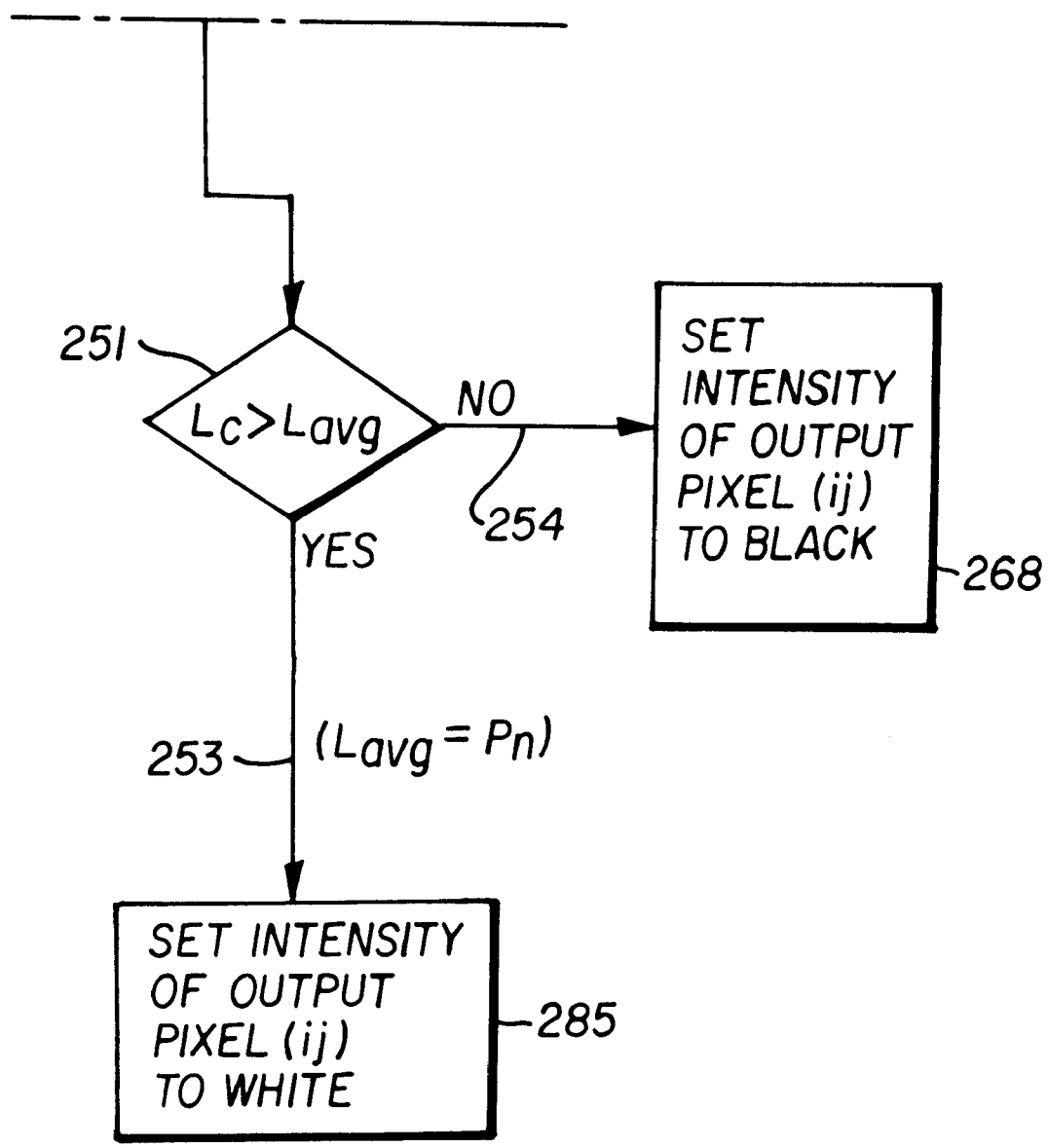

Edge-Based Image Thresholding:

FIGS. 2A and 2B, for which the correct alignment is shown in FIG. 2, are a block diagram of image processing that performs edge-based adaptive thresholding process 10 of FIG. 1. A multi-windowing edge-based adaptive thresholding process is performed for each and every gray-scale pixel in an incoming image, thereby iterating through the image. Since the manner through which each gray-scale image pixel is processed is identical across all such pixels, we will merely discuss this routine in the context of processing generalized pixel (i,j), where "i" and "j" are positive integers and define pixel horizontal and vertical indices within the incoming gray-scale image. In addition to gray-scale image data, a user supplies values of two input parameters, specifically fixed intensity threshold IT and gradient strength threshold GT. These thresholds can be selected to provide satisfactory thresholding across a multitude of differing images with varying characteristics, such as contrast and illumination, or can be adjusted to provide optimum thresholding for any one type of image and/or scanning condition. In any event, as a result of performing the multi-windowing edge-based adaptive thresholding process on all such gray-scale image pixels, a thresholded binary or modified gray-scale image will be generated, with each pixel in the resulting image corresponding to a pixel in the incoming image.

In particular, upon starting the multi-windowing edge-based adaptive thresholding process, step 203 determines a gradient strength G for pixel (i,j). This is accomplished by use of the so-called "Sobel" gradient operator on a window of pixels centered about pixel (i,j). As shown in FIG. 3A, this matrix, shown as matrix 310, is a 3-by-3 window centered about pixel (ij). As collectively defined in equations (1)–(3) below, the Sobel operator relies on computing horizontal and vertical pixel intensity gradients, GX(i,j) and GY(i,j), respectively, and for each pixel position (ij) forming the gradient strength, G(i,j) as an absolute sum of GX(i,j) and GY(i,j):

$$GX(i,j)=L(i+1,j-1)+2L(i+1,j)+L(i+1,j+1)-L(i-1,j-1)-2L(i-1,j)-L(i-1,j+1); \quad (1)$$

$$GY(i,j)=L(i-1,j+1)+2L(i,j+1)+L(i+1,j+1)-L(i-1,j-1)-2L(i,j-1)-L(i+1,j-1); \quad (2)$$

and $$G(i,j)=|GX(i,j)|+|GY(i,j)| \quad (3)$$

where L(i,j) is the image intensity, luminance, at pixel position (ij). The resulting gradient strength value for every image pixel collectively forms a gradient strength record for the entire scanned image.

Once the gradient strength, G(i,j), is determined for pixel (i,j), edge-based adaptive thresholding process 10 advances to step 225. This step, when performed, determines the area gradient for pixel position (i,j), i.e., GS(i,j), as the sum of the gradient strengths G(i,j) for each and every pixel position within an (N−2)-by-(N−2) window centered about pixel position (i,j). This window is illustratively 5-by-5 pixels in size and is shown, as window 370, in FIG. 3C for an N-by-N, illustratively 7-by-7, window shown in FIG. 3B, the latter being window 330, centered about pixel (i,j). For purposes of comparison, the periphery of an N-by-N window is shown as window 350 in FIG. 3C. Though shown sequentially to simplify illustration, step 245 is generally performed at essentially the same time, as symbolized by dashed line 244, as is steps 203 and 206. Step 245 determines both minimum and maximum pixel intensity values, $L_{min}$ and $L_{max}$, respectively, in an N-by-N window centered about pixel (i,j).

Once the area gradient is determined for pixel position (i,j), then, through the remainder of edge-based adaptive thresholding process 10, the three image measures, GS(i,j), $L_{min}$, and $L_{max}$, associated with this particular pixel position are used to classify pixel (ij) as an object pixel, i.e., black, or a background pixel, i.e., white.

In particular, decision step 208 is performed to assess whether the value of the area gradient for pixel (i,j), i.e., GS(i,j), exceeds a pre-defined threshold value, GT, or not. This test determines whether pixel (i,j) lies in a vicinity of an edge in the scanned image, or not. If the area gradient is less than the threshold value, GT, then pixel (i,j) does not lie near an edge. Hence, pixel (i,j) lies within a localized relatively constant tone, i.e., "flat" field, region of the scanned gray-scale image. In this case, edge-based adaptive thresholding process 10 advances along NO path 211 emanating from decision block 208 to decision block 215. This latter decision block determines whether the gray-scale intensity of pixel (i,j), i.e., $L_c$, exceeds pre-defined threshold value, IT. If this gray-scale value is less than the threshold, the pixel is classified as an object pixel, i.e., here black; otherwise, the pixel is classified as a background pixel, i.e., here white. Specifically, on the one hand, if pixel intensity, $L_c$, is less than or equal to threshold IT, decision block 215 advances process 10, along NO path 217, to block 228 which, in turn, sets an intensity of output pixel (i,j) to black, i.e., ZERO. If, on the other hand, pixel intensity, $L_c$, exceeds threshold IT, decision block 215 advances edge-based adaptive thresholding process 10, along YES path 218, to block 237 which, in turn, sets an intensity of output pixel (i,j) to white, i.e., ONE. Once step 228 or 237 is performed, process 10 is completed for pixel (ij); the method is then repeated for the next image pixel in succession, and so forth.

Alternatively, if when decision step 208 is performed, it is found that area gradient, GS(i,j) exceeds threshold value GT, then pixel (ij) lies in the vicinity of an edge. In this case, step 245 is now performed to ascertain the values of $L_{max}$ and $L_{min}$, if these values have not already been determined, as set forth above. Thereafter, edge-based adaptive thresholding process 10 advances to block 248 which calculates an average pixel intensity value, $L_{avg}$, occurring within the N-by-N pixel window centered about pixel position (i,j). This average intensity value is simply determined by averaging the values $L_{max}$ and $L_{min}$.

Once this average value has been ascertained, edge-based adaptive thresholding process 10 advances to decision block 251 which compares the intensity of pixel (i,j), i.e., $L_c$, against its associated average intensity value, $L_{avg}$. If this pixel is situated on a darker side of an edge and hence is an object pixel, its associated average intensity value will be greater than or equal to its intensity value, $L_c$. In this case, decision block 251 advances edge-based adaptive thresholding process 10, along NO path 254, to block 268 which, in turn, sets an intensity of output pixel (ij) to black, i.e., ZERO. Otherwise, if pixel (ij) is situated near an edge but its average intensity value, $L_{avg}$, would be less than its intensity value, $L_c$, then decision block 251 advances edge-based adaptive thresholding process 10, along YES path 253, to block 285 which, in turn, sets an intensity of output pixel (ij) to white, i.e., ONE. Once step 268 or 285 has been performed for pixel (ij); edge-based adaptive thresholding process 10 is then repeated for the next image pixel in succession, and so forth.

The quality of the resulting thresholded image produced is controlled by the values defined for thresholds GT and IT. Threshold GT is set to properly classify image pixels located in the vicinity of edges in an image. A relatively low GT value tends to extract edge pixels of light objects. Threshold IT is set to properly classify pixels located in image regions of uniform tone, i.e., "flat" fields. In that regard, a low IT value tends to classify pixels of a uniform gray region as white background. If a relatively high GT value is used, then the process performs similar to "simple" thresholding with a fixed threshold IT. In this situation, the value of threshold GT will always be larger than the area gradient, thereby causing the process to classify pixels by essentially solely comparing each image pixel of interest against fixed threshold IT. The process can also produce an outline image through setting the value of threshold IT to ZERO, in which case all the image pixels will be classified as white except for the edge pixels where their associated area gradients are larger than the gradient threshold, GT.

The Detection of Halftone Regions

Figure 4:
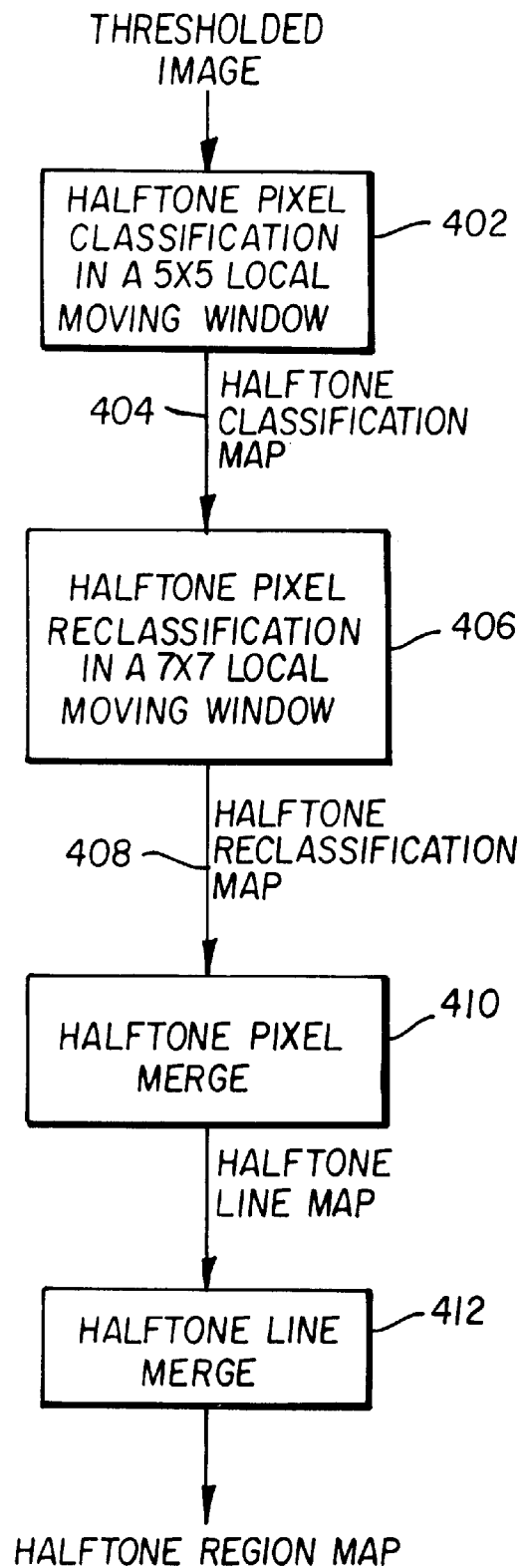
FIG. 4 is a flowchart of halftone region detection.

FIG. 4 is a block diagram of halftone region detection process 16 (FIG. 1) for identifying halftone regions within the thresholded image on 14. Generally, a halftone pixel classification process 402 is applied to the thresholded image to produce a halftone classification map on output 404. Next, a halftone pixel reclassification process 406 is applied to the halftone classification map to produce a halftone reclassification map on output 408. The reclassification is operated to correct any classification errors occurring in halftone pixel classification process 402. Next, a halftone pixel merging process is applied to each individual line in the halftone reclassification map to produce a halftone line map. Finally, a halftone line merging process 412 is applied to the halftone line map to produce a halftone region map.

The Halftone Pixel Classification

Figure 5:
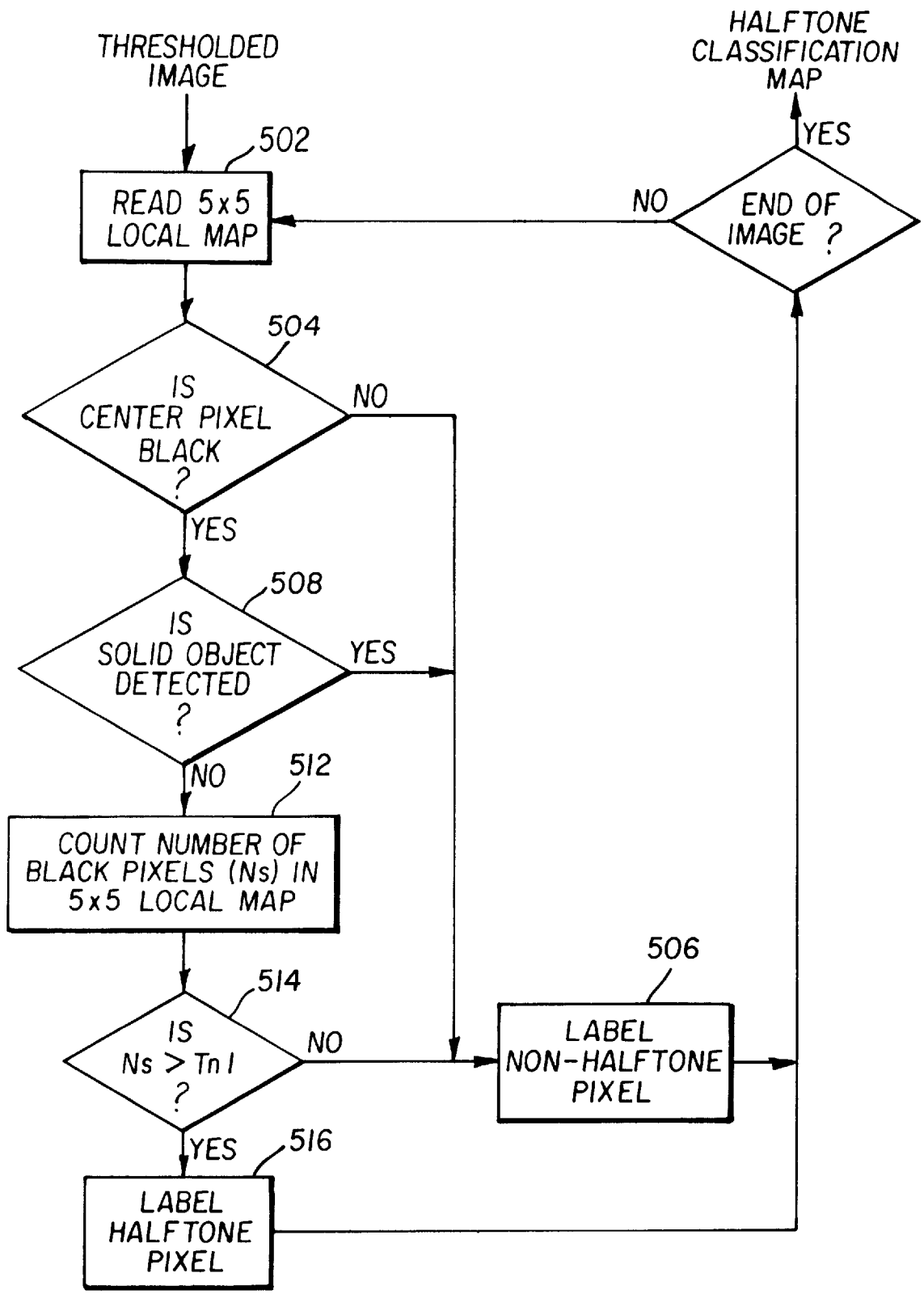
FIG. 5 is a flowchart of halftone pixel classification in a 5×5 local moving window.

FIG. 5 is the block diagram of halftone pixel classification process 402 of FIG. 4. It reads a window of 5×5 local map data centered about pixel (i,j) from the thresholded image as shown in FIG. 3B (step 502). If the center pixel (ij) is white, as determined at decision block 504, it is marked as a non-halftone pixel at step 506.

Figure 6:
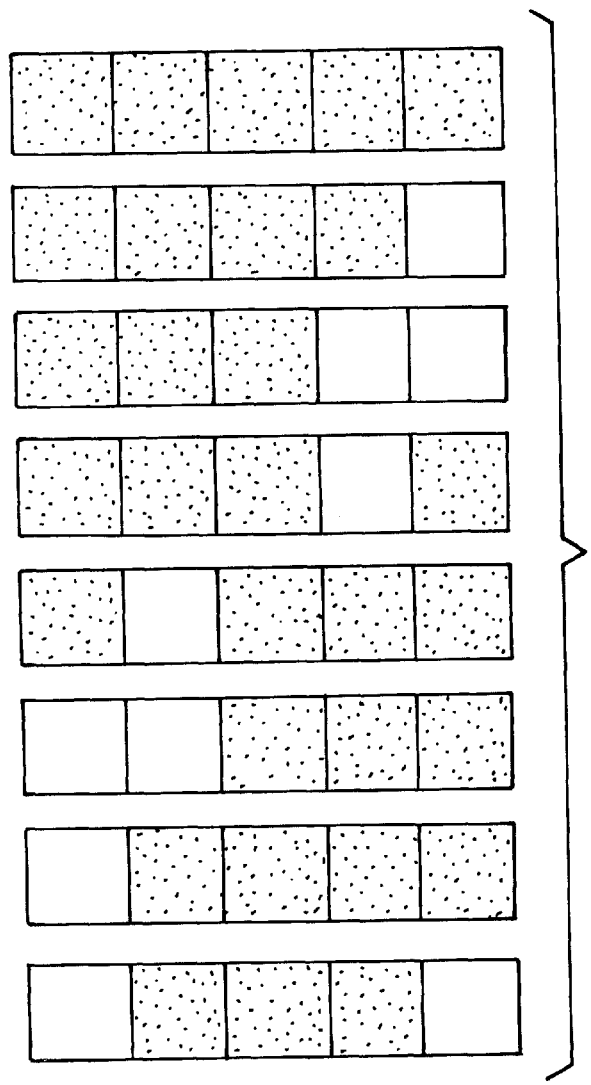
FIG. 6 is a 5×5 local window which is used in analyzing the edge pixel distribution for halftone classification.
Figure 7:
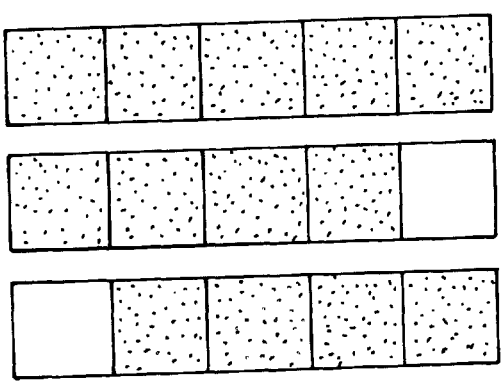
FIG. 7 shows the eight possible edge pixel combinations in which the center pixel of the 5×5 local window as halftone is not considered as halftone.

If the center pixel (i,j) is black as determined at decision block 504, the process progresses to a decision block 508 at which a search for more than two (or three) consecutive black pixels in a row or in a column of the 5×5 local map is performed. The all possible combinatory patterns of more than two consecutive black pixels in a 5×5 window are shown in FIG. 6. FIG. 7 shows the three possible patterns of more than three consecutive black pixels. If a 5×5 local map contains any one of the patterns in FIG. 6 or FIG. 7, decision block 508 indicates that a solid object is detected and the center pixel (ij) is marked as a non-halftone pixel at step 506.

If the 5×5 local map does not contain any one of the patterns in FIG. 6 or FIG. 7 as determined at decision block 508, the process goes to a next step 512 at which the number of the black pixels Ns in the 5×5 local map are counted. If the number Ns of black pixels is greater than a threshold value Tn1 as determined at decision block 514, the center pixel (i,j) is labeled as a halftone pixel at step 516. Otherwise, it is labeled as a non-halftone pixel at step 506. The process described above is repeated for every image pixel until the end of the image. The output of the process is a halftone classification map on output 404 of FIG. 4.

Figure 8:
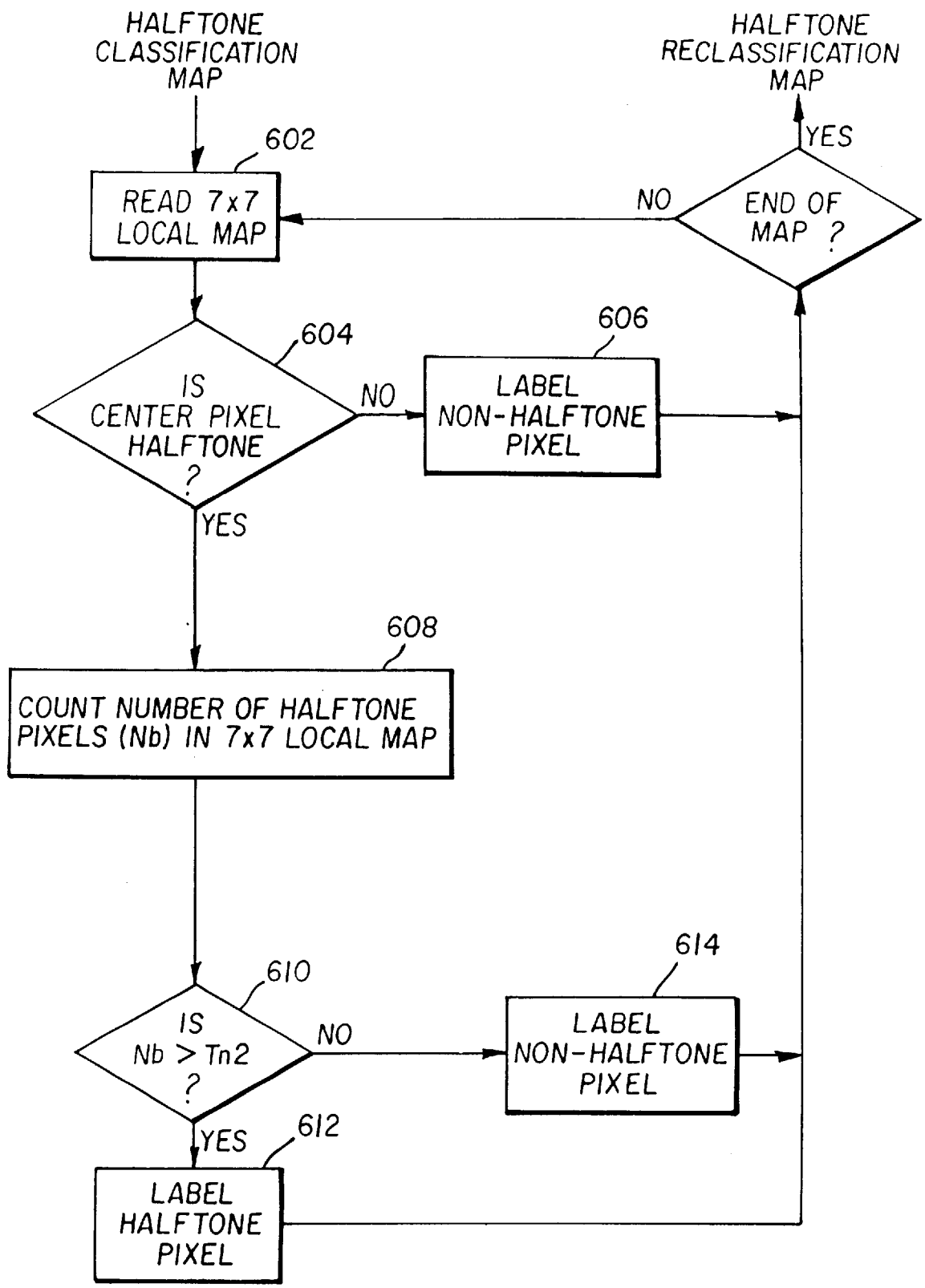
FIG. 8 is a flowchart of halftone pixel reclassification in a 7×7 local moving window.

The Halftone Pixel Reclassification:

FIG. 8 is a block diagram of halftone reclassification process 406 of FIG. 4. It reads a window of 7×7 local map data centered about pixel (ij) from the halftone classification map (step 602). If the center pixel (ij) is non-halftone, as determined at decision block 604, it is marked as non-halftone pixel at step 606.

If the center pixel (ij) is a halftone pixel as determined at decision block 604, the process goes to step 608 at which the number "Nb" of the halftone pixels in the 7×7 local map is counted. If the number "Nb" is greater than a threshold value Tn2 as determined at decision block 610, the center pixel (i,j) is labeled as a halftone pixel at step 612. Otherwise, it is labeled as a non-halftone pixel at step 614. Again, the process is repeated for every pixel of the halftone classification map until the end of the map. The output of the process is a halftone classification map on output 408 of FIG. 4.

Extraction of Halftone Line Segments:

FIGS. 9(A) and 9(B) show that a threshold value "Th" is set as criteria in grouping one-dimensional halftone pixels into a halftone line segment. The "x" mark indicates the halftone pixel and the white space is non-halftone pixel in a line of the halftone reclassification map. When the number "Nh" of the halftone pixels in a line is greater than the threshold value "Th", the intermediate white spaces between the two extreme halftone pixel points located at x1 and x2 are filled with halftone mark "x", as shown in FIG. 9(A). Otherwise, all of the halftone pixels in the line are deleted as the example shown in FIG. 9(B).

Figure 10A:
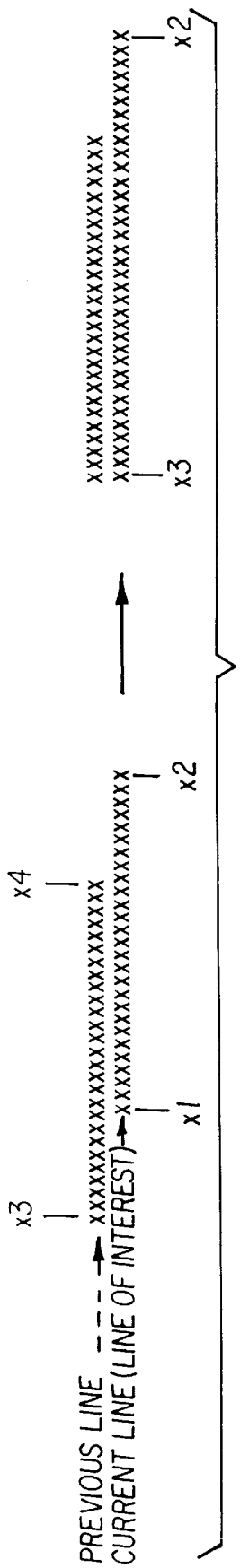
FIGS. 10(A)–10(C) are examples of forming halftone regions based on the overlapping of two adjacent halftone line segments.
Figure 10B:
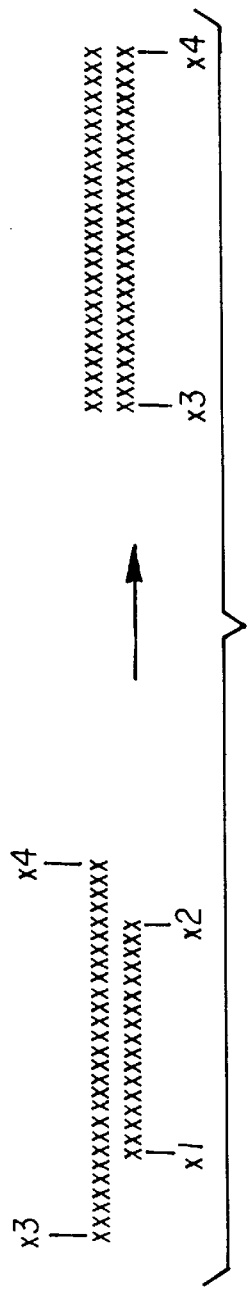
Figure 10C:
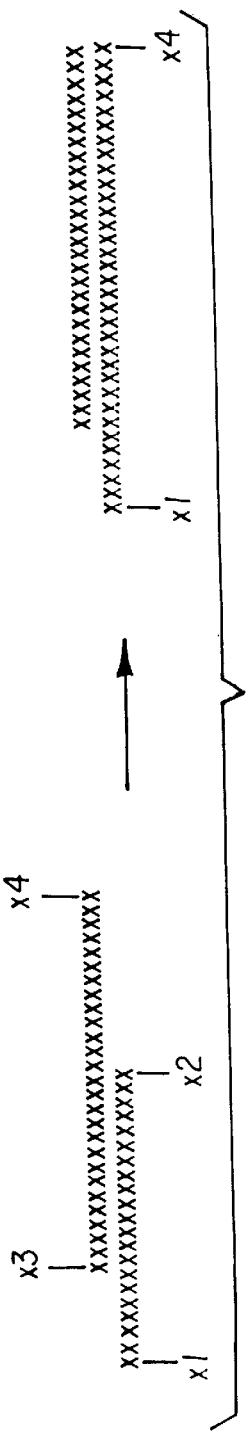

In order to produce a smooth border of halftone regions, the resulting bounding coordinates (x1 and x2) derived in FIGS. 9(A) and 9(B) require further adjustment by comparing the x1 and x2 of the current halftone line with the bounding coordinates (x3 and x4) of the previous halftone line segment. The adjusted bounding coordinates of the current halftone line segment are taken as min(x1,x3) and max(x2,x4). The three examples are shown in FIGS. 10(A), 10(B) and 10(C).

Figure 11:
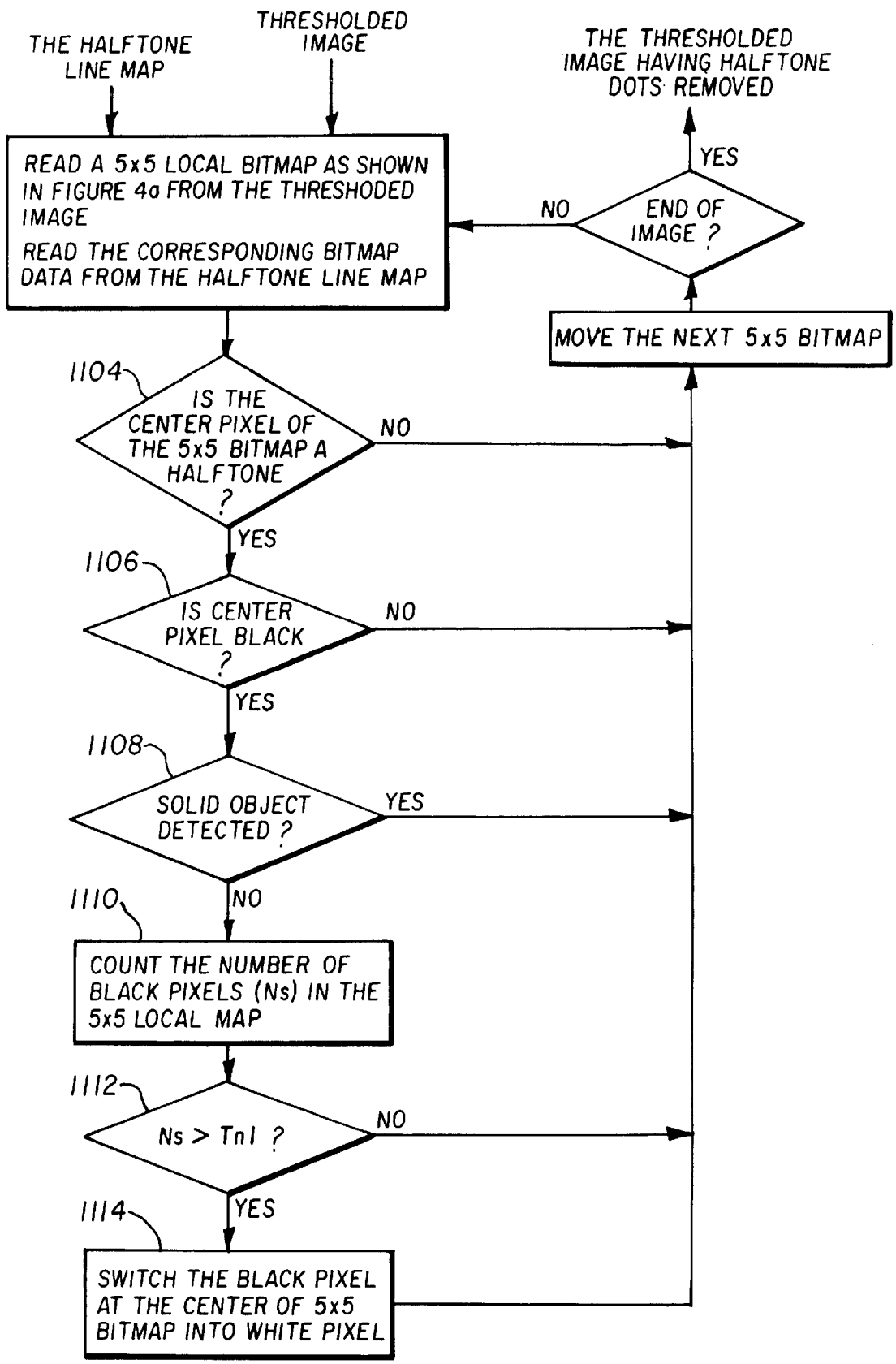
FIG. 11 is a flowchart of halftone dots removal.

The Removal of Halftone Pixels:

Once the halftone pixels in a document image are labeled as represented in the halftone line map on output 18 of FIG. 1, halftone pixel removal process 20 of FIG. 1 is started and strictly applied to the halftone pixels only. FIG. 11 is the block diagram of the halftone pixel removal process. The process is similar to the one in the halftone classification as shown in FIG. 5. It reads a window of 5×5 local map data centered about pixel (i,j) from the thresholded image and also reads the corresponding data of the 5×5 location in the halftone line map (step 1102).

If the center pixel (i,j) is a halftone pixel which is marked as ONE in the halftone line map (decision block 1104) and is black (decision block 1106), a search for more than two (or three) consecutive black pixels in a row or in a column of the 5×5 local map is performed at decision block 1108. The all possible combinatory patterns of more than two consecutive black pixels in a 5×5 window are shown in FIG. 6. FIG. 7 shows the three possible patterns of more than three consecutive black pixels.

If a 5×5 local map contains any one of the patterns in FIG. 6 or FIG. 7, it indicates that the center pixel (i,j) is not a candidate for halftone removal, and simply moves to the next 5×5 map to restart the process. Otherwise, it goes to next step 1110 by counting the number of the black pixels "Ns" in the 5×5 local map. If the number "Ns" is greater than a threshold value "Tn1", as determined at decision block 1112, center pixel (i,j) in the thresholded image, which is a black pixel, is considered as halftone pixel to be removed.

The removal process is made by switching the center pixel (i,j) into a white pixel in the thresholded image at step 1114. The process described above is repeated for every image pixel until the end of the thresholded image. The output of the process is the thresholded image 22 of FIG. 1 which has halftone dots removed.

The Edge Smoothing for Characters Embedded in a Halftone Field:

The edges (or outlines) of a character which is embedded in a halftone field appear quite jagged due to the nature of halftone printing after the halftone removal process. Binary median filter 24 of FIG. 1 is taken as a post image processing to reduce the jaggedness of the character outlines. The median filter is applied to the halftone pixels only as it did in the halftone removal process. The median filter smoothes the character edges by setting the center pixel of a 3×3 local map to the majority of the elements in a 3×3 binary map. In a 3×3 window, there are nine elements. Each element is either "ONE" (black) or "ZERO" (white). The majority of the elements is ONE (black) if there are more than four "ONE" pixels in the nine elements. Otherwise, the majority of the elements will be "ZERO" (white).

Figure 12:
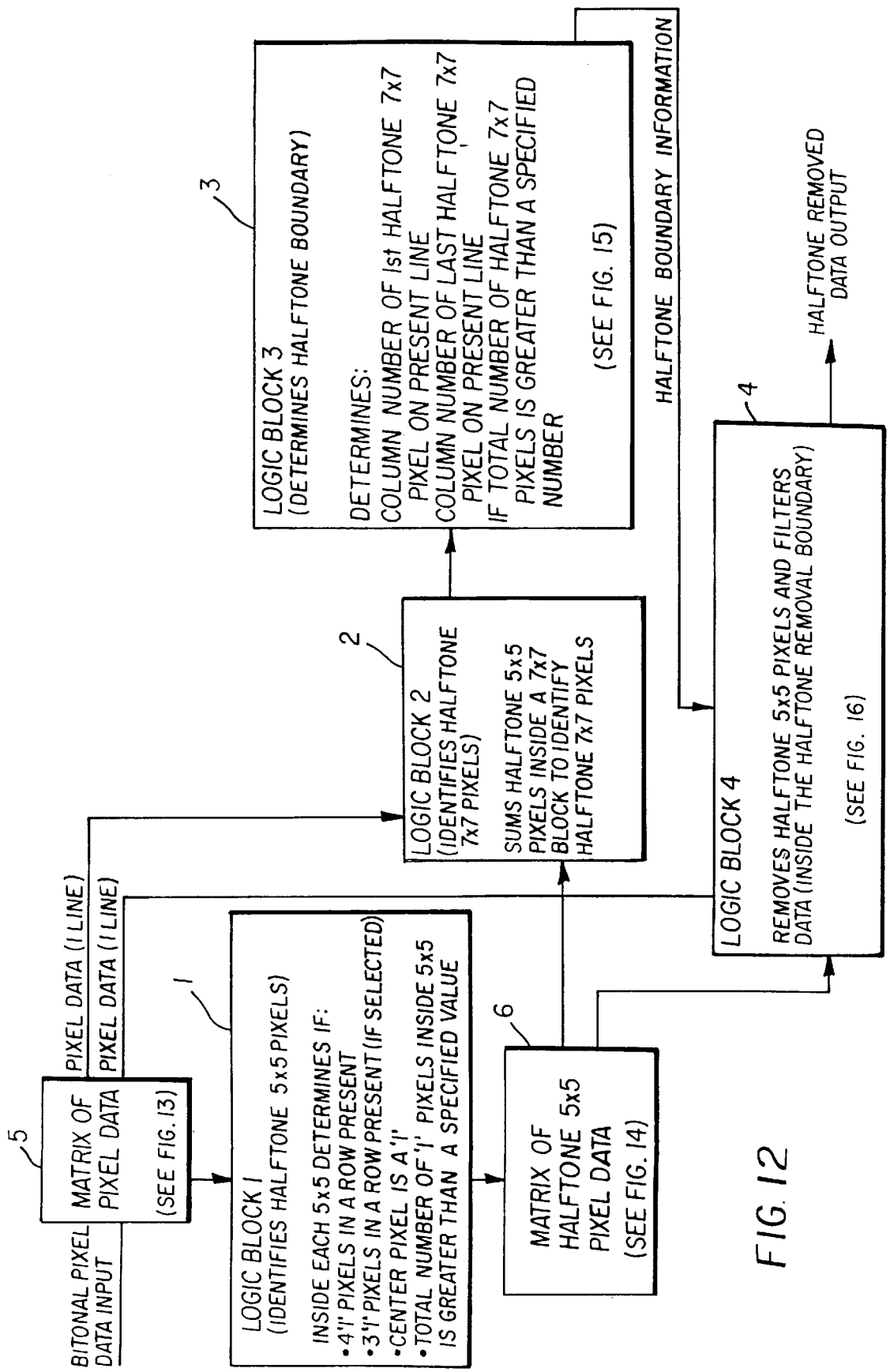
FIG. 12 is an overall block diagram of a preferred implementation of the present invention.

Preferred Implementation:

FIG. 12 for an overall block diagram of a preferred implementation of the present invention. FIGS. 13–16 are more detailed views of four of the blocks in FIG. 12.

Pixel data is totally processed in three passes. All three passes are implemented at the same time, but each consecutive pass is performed after the data has shifted down one line.

A 5×5 pixel matrix is created using a 5×5 block of registers and line buffers. This is shown as block 5 in FIG. 12 and drawn in more detail in FIG. 13. This 5×5 matrix allows us to view a 5×5 pixel window moving through the image. The first pass uses this 5×5 pixel window and logic block 1 of FIG. 12 to identify halftone 5×5 pixels. A halftone 5×5 pixel is a pixel at the center of a 5×5 pixel window which meets the following conditions:

1. The center pixel is a "ONE".
2. There are more than a specified (programmable) number of "ONE" pixels inside the 5×5 window.
3. There are no consecutive four vertical or horizontal "ONE" pixels in a row inside the 5×5 window (no consecutive three in a row can also be selected through programming).

Figure 13:
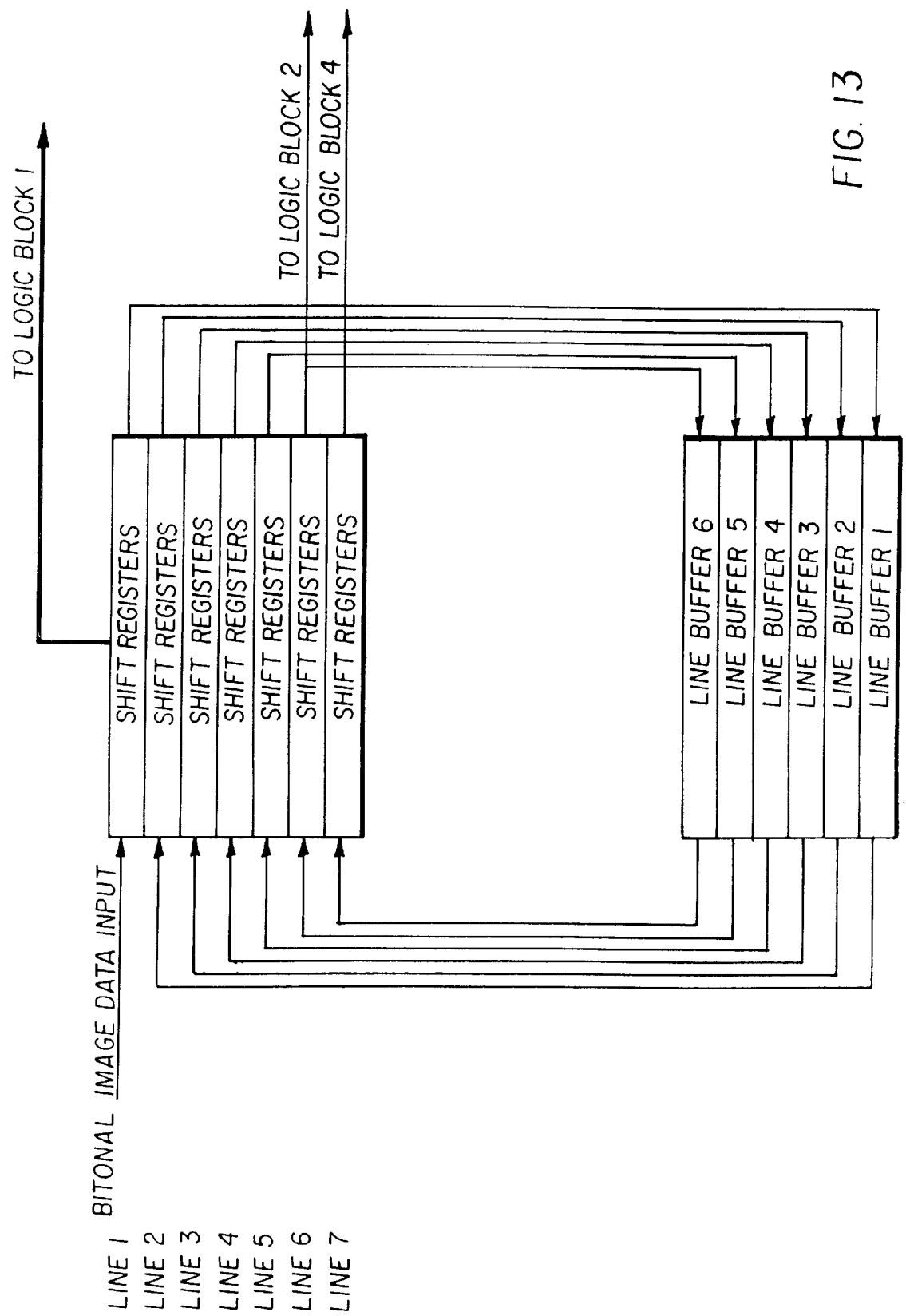
FIGS. 13–16 are more detailed views of four of the blocks in FIG. 12.

This halftone 5×5 pixel data is for line 3 of FIG. 13 since pixels on line 3 are at the center of the 5×5 window being processed. Halftone 5×5 pixel data is then fed into a 7×7 matrix which is shown as block 6 in FIG. 12 and shown in more detail in FIG. 14. Viewing this 7×7 matrix is equivalent to viewing a 7×7 pixel window moving through the image, but the only information displayed in this window is whether each pixel is halftone 5×5 or not. Block 2 of FIG. 12 then uses the 7×7 matrix of halftone 5×5 pixel data (from block 6), and pixel data from block 5, to determine if the center pixel of this matrix is a halftone 7×7 pixel. A halftone 7×7 pixel is a pixel at the center of a 7×7 pixel window in which meets the following conditions:

1. The center pixel is a "ONE".
2. There are more than a specified number of halftone 5×5 pixels inside the 7×7 pixel window.

Figure 14:
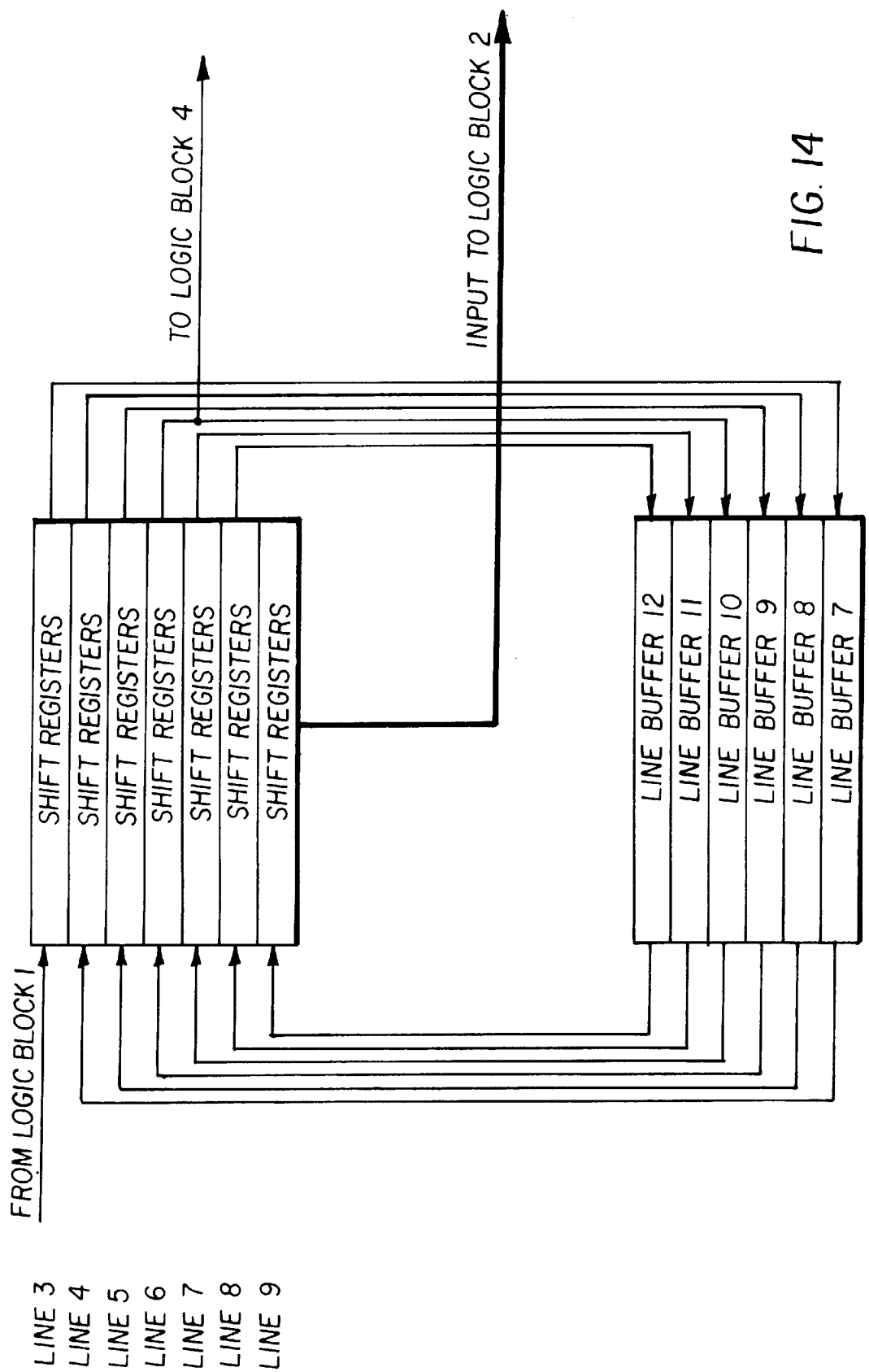
Figure 15B:
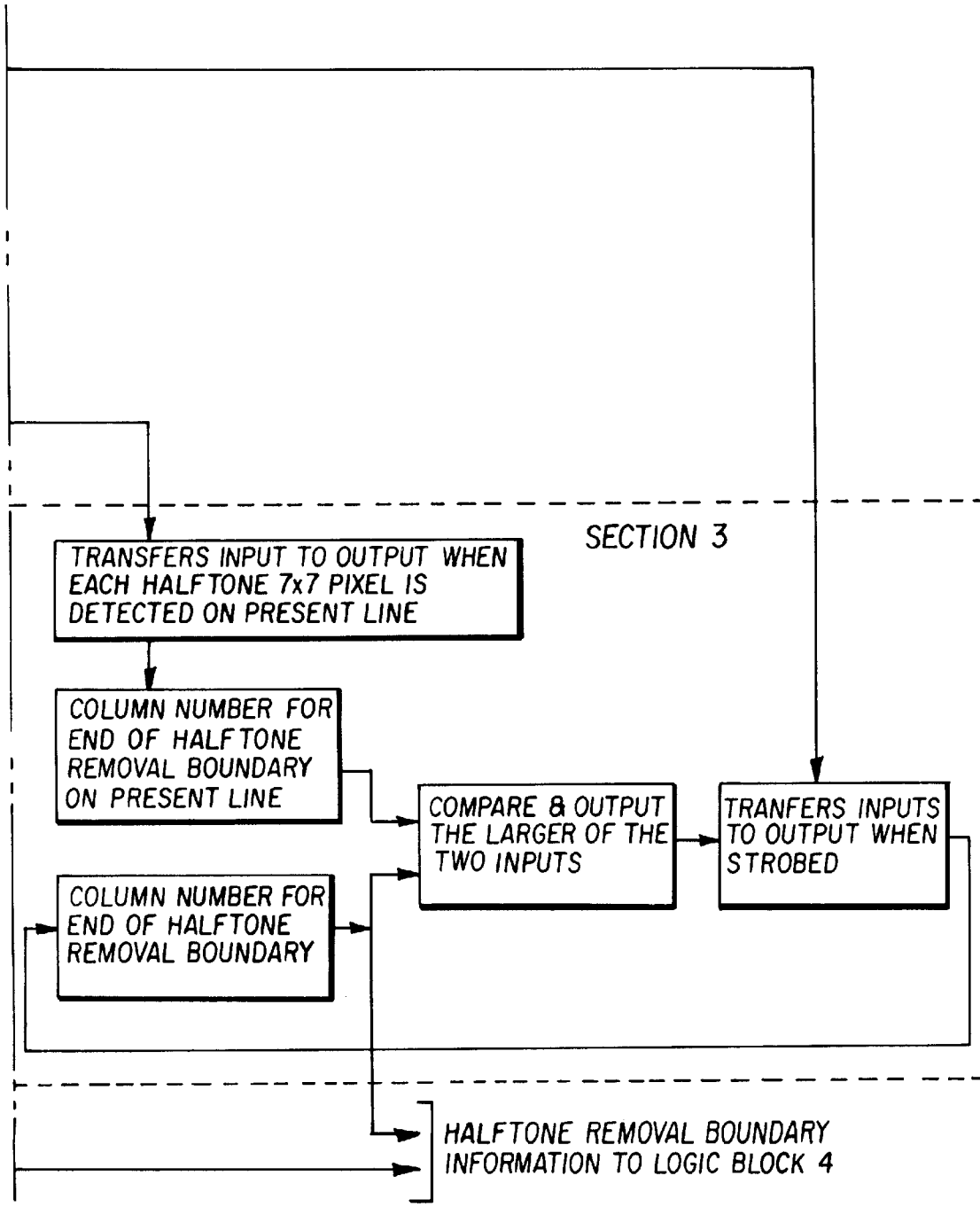

This halftone 5×5 data is for line 6 of FIG. 14 since line 6 is at the center of the 7×7 window that was processed. Halftone 7×7 pixel information is then fed into Logic Block 3 of FIG. 12. Refer to FIG. 15 for a detailed drawing of Logic Block 3. This is where the halftone removal boundaries will be updated. The halftone removal boundaries are defined by two pixel column numbers. All halftone 5×5 pixels between these columns will eventually be removed (changed from a "ONE" to a "ZERO"). This logic is divided into three sections as shown by the dotted lines in FIG. 15. Section 1 counts halftone 7×7 pixels on the present line. If this total is larger than a programmed constant, section 1 outputs a strobe signal. The strobe signal indicates to section 2 and 3 that the present line has enough halftone pixels to need halftone removal. If the present line does not have enough halftone 7×7 pixels to require halftone removal then section 1 outputs a reset signal which will set the halftone removal boundaries in sections 2 and 3 to "ZERO" so that no halftone removal will be performed on this line. Section 2 and 3 update the boundary for the left and right side of the line respectively. When section 2 updates the left side column boundary, it keeps the lesser of the present line left column boundary and the previous line left column boundary, to make the new left halftone removal boundary the farthest to the left of the two. Section 3 uses the same method to take the farthest to the right of the present line right side column number and the previous line right side column number.

Figure 16A:
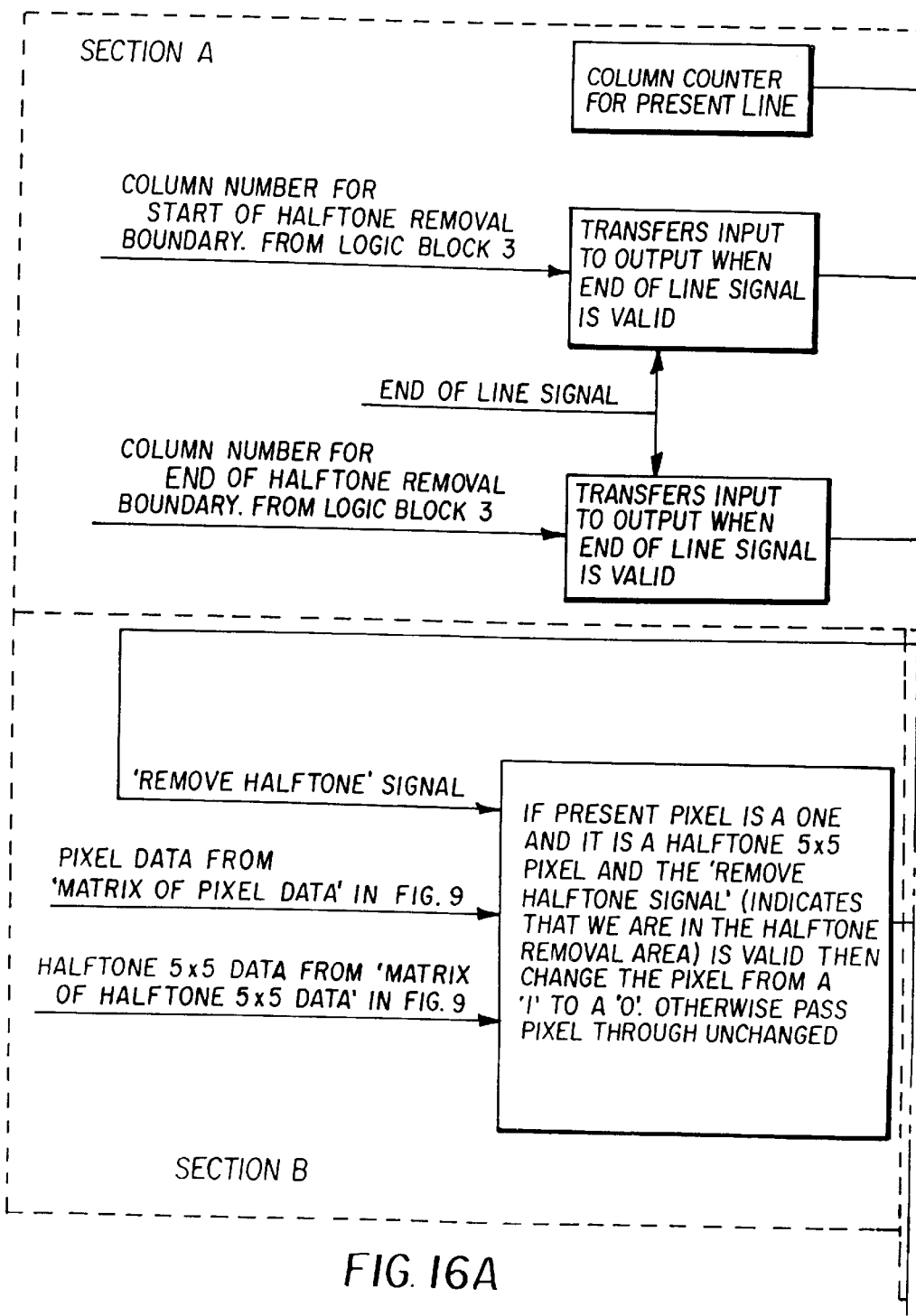
Figure 16B:
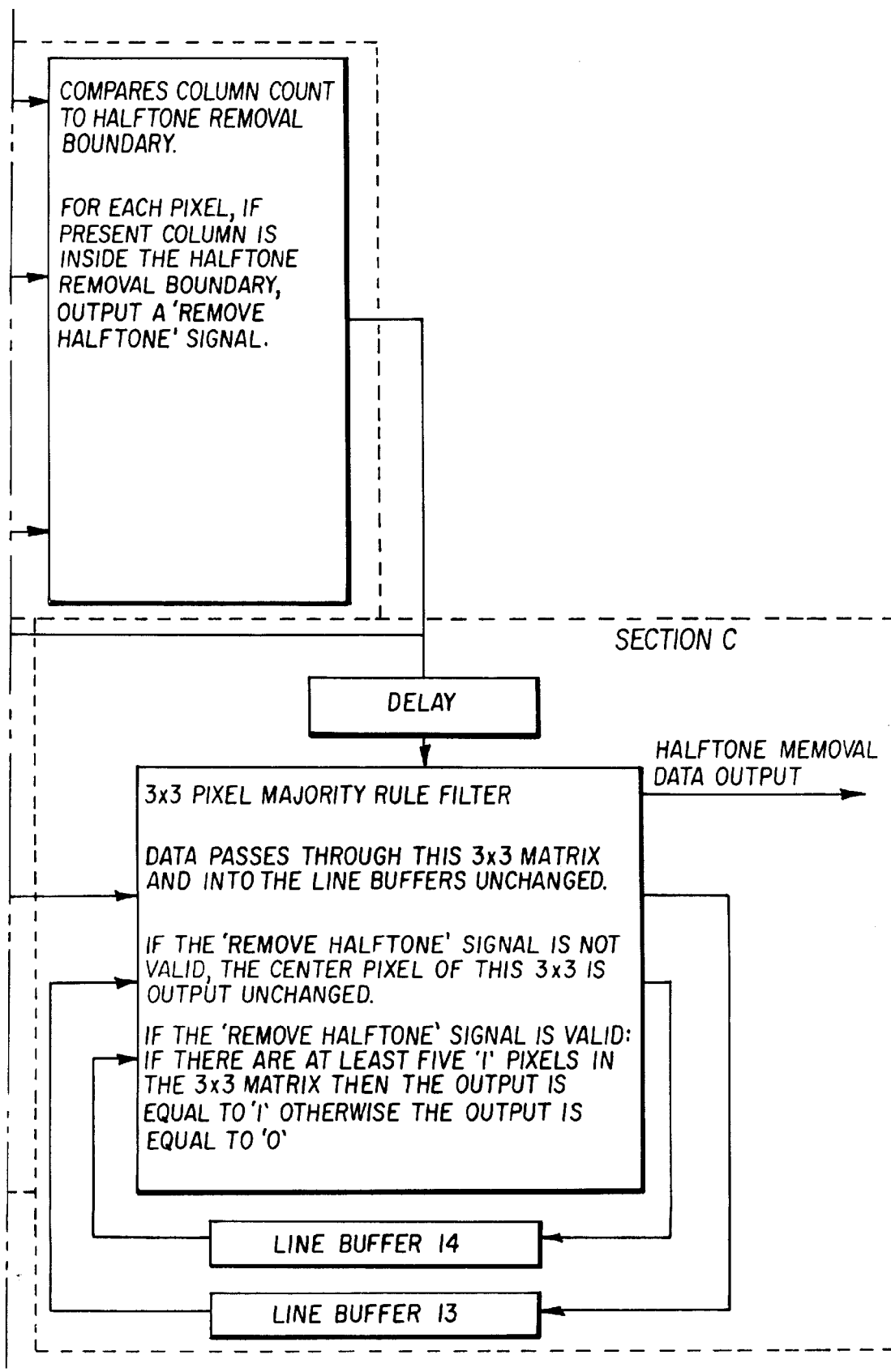

The second pass is performed by Logic Block 4 of FIG. 12. Refer to FIG. 16 for a more detailed drawing. Note that the 'present line' for pass 2 is now the same line as the 'previous line' for pass 1. Section A saved the halftone removal boundaries (from Logic Block 3 of FIG. 12) for the line we are presently processing at the end of the line in pass 1. Section A outputs a 'remove halftone' signal for each pixel that is inside the halftone removal boundary. Section B removes (changes for "ONE" to "ZERO") all halftone 5×5 pixels that are inside the halftone area and passes the data to the upper left corner of a 3×3 matrix in section C.

The Majority Rule Filter is implemented in Section C. This function is performed in the third and final pass. This must be performed one line later (pass 3) than halftone removal (pass 2) because we are operating on the center pixel of the 3×3 halftone removed pixel data window. A delayed (by one line and the appropriate number of pixels) 'halftone area' signal is used to apply the median filter only inside the halftone removal boundary. Outside the halftone removal boundary the center pixel of the 3×3 is output unchanged.

The invention has been described in detail with particular reference to preferred embodiments thereof, but it will be understood that variations and modifications can be effected within the spirit and scope of the invention.

What is claimed is:

1. An image processing method for detection and removal of halftone dots, said method comprising the steps of:

converting a gray scale image into a binary thresholded image with halftone identifying halftone regions within the binary thresholded image, wherein the identifying halftone regions step is effected by:

classifying the binary thresholded image to produce a halftone classification map;

reclassifying the halftone classification map to produce a halftone reclassification map of lines with plural halftone pixels in each line;

merging the halftone pixels in each line in the halftone reclassification map to produce a halftone line map; and merging the lines of the halftone line map to produce a halftone region map; and removing halftone dots from the identified halftone regions.

2. An image processing method as set forth in claim 1, wherein the binary thresholded image classifying step classifies a pixel at the center of an (N−2)-pixel by (N−2)-pixel local map as non-halftone if any one or more of the following criteria apply:

the pixel is a background pixel;

the pixel is part of a solid object; and less than a predetermined number of pixels of the local map are object pixels.

3. An image processing method as set forth in claim 2, wherein N=7.

4. An image processing method as set forth in claim 2, wherein the binary thresholded image classifying step determines if the pixel at the center of the (N−2)-pixel by (N−2)-pixel local map is part of a solid object by determining if the (N−2)-pixel by (N−2)-pixel local map contains more than a threshold number of consecutive object pixels.

5. An image processing method as set forth in claim 4, wherein N=7.

6. An image processing method as set forth in claim 5, wherein the threshold number is 3.

7. An image processing method as set forth in claim 1, wherein the halftone classification map reclassifying step determines if the pixel at the center of a local window of the halftone classification map is a non-halftone pixel if any one or more of the following criteria apply:

the center pixel is a non-halftone pixel; and less than a predetermined number of pixels of the local map are halftone pixels.

8. An image processing method as set forth in claim 7, wherein the halftone pixels merging step includes grouping pixels into line segments by:

designating all pixels of a line segment as halftone pixels if the line has more halftone pixels than non-halftone pixels; and designating all pixels of a line segment as non-halftone pixels if the line has more non-halftone pixels than halftone pixels.

9. An image processing method comprising the steps of:

capturing a document image;

extracting every edge pixel whose gradient is greater than a predetermined gradient threshold;

classifying every extracted edge pixel as either a halftone pixel or a nonhalftone pixel;

re-assigning the classified edge pixels based on the total number of halftone edge pixels which are classified in the previous step;

correcting and merging the classified halftone pixels into halftone line segments;

growing the halftone line segments into two dimensional halftone maps;

deleting halftone pixels which were extracted in the classification of halftone edge pixels in the identified halftone maps; and minimizing noise and smoothing character outlines in the identified halftone locations.

10. An image processing method as set forth in claim 9, wherein the minimizing and smoothing step is effected by applying a median filter to character outlines in the identified halftone locations.

\* \* \* \* \*